United States Patent
Staczek

(10) Patent No.: US 7,857,556 B1
(45) Date of Patent: Dec. 28, 2010

(54) MULTI-FUNCTION DRILL PRESS SYSTEM

(76) Inventor: Roman Staczek, 9689 Commmodore Dr., Seminole, FL (US) 33776

( * ) Notice: Subject to any disclaimer, the term of this patent is extended or adjusted under 35 U.S.C. 154(b) by 211 days.

(21) Appl. No.: 12/313,745

(22) Filed: Nov. 24, 2008

(51) Int. Cl.
*B23B 39/00* (2006.01)

(52) U.S. Cl. .............. 408/89; 408/90; 408/91; 269/57; 269/63; 269/81; 269/82

(58) Field of Classification Search ............ 408/87, 408/89–91, 103; 269/56–57, 63, 71, 74, 269/81–82
See application file for complete search history.

(56) References Cited

U.S. PATENT DOCUMENTS

| | | | | |
|---|---|---|---|---|
| 2,383,201 A * | 8/1945 | Kruchten | ............ | 269/81 |
| 2,471,940 A * | 5/1949 | Dion | ............ | 408/89 |
| 2,649,819 A * | 8/1953 | Hussey | ............ | 269/82 |
| 2,923,179 A * | 2/1960 | Pierce | ............ | 269/84 |
| 3,359,836 A * | 12/1967 | Jalava | ............ | 408/89 |
| 4,418,901 A * | 12/1983 | Woods et al. | ............ | 269/71 |
| 5,544,988 A * | 8/1996 | Liu | ............ | 408/90 |
| 5,547,319 A * | 8/1996 | Pollak | ............ | 408/90 |
| 5,960,531 A * | 10/1999 | Mora et al. | ............ | 29/560 |
| 6,705,809 B2 * | 3/2004 | Manos, Jr. | ............ | 408/89 |
| 2006/0245834 A1 * | 11/2006 | Lay et al. | ............ | 408/89 |

* cited by examiner

*Primary Examiner*—Daniel W Howell

(57) ABSTRACT

A drill press has a bit, a base and a support shaft with a lower end supported by the base and an upper end supporting the housing. A lower plate with a connector coupled between the lower plate and the support shaft varies the angular attitude of lower plate with respect to the bit. An upper plate with threaded apertures, recesses, blocks and bolts secures the upper plate in preselected planar positions with respect to the lower plate. Aligned central apertures in the plates with a pivot pin provide a plurality of preselected rotational orientations of the upper plate with respect to the lower plate.

6 Claims, 4 Drawing Sheets

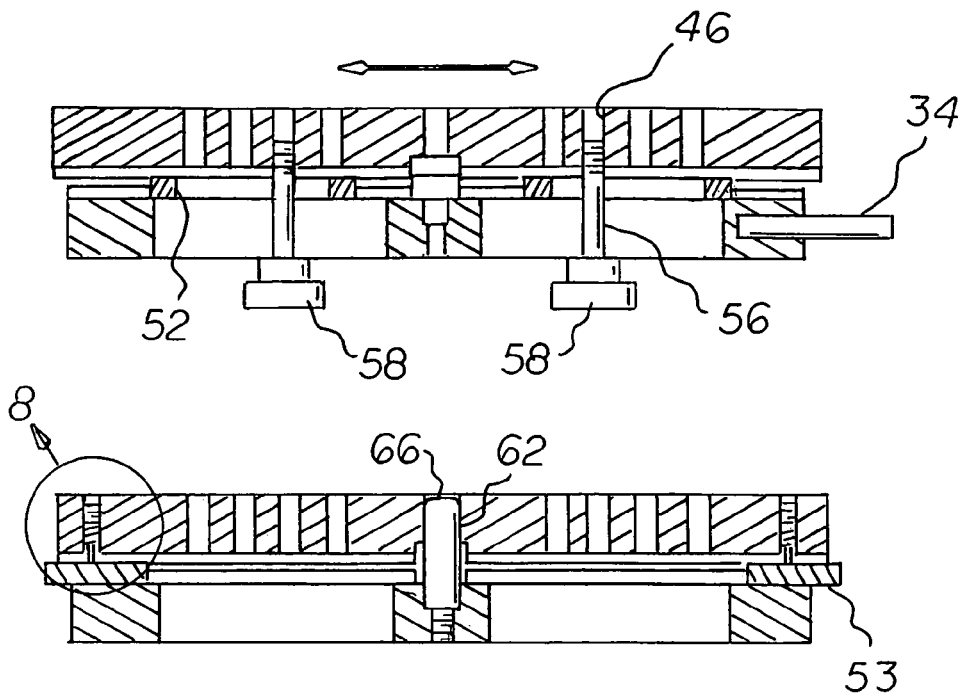
FIG 5
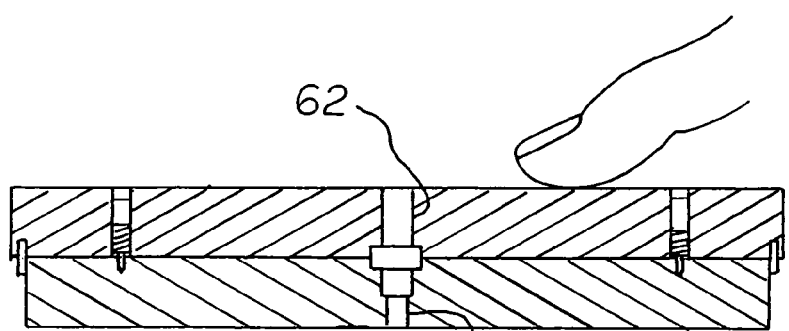
FIG 6
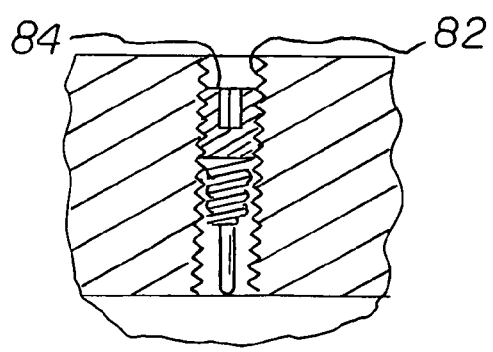
FIG 7
FIG 8

MULTI-FUNCTION DRILL PRESS SYSTEM

BACKGROUND OF THE INVENTION

1. Field of the Invention

The present invention relates to a multi-function drill press system and more particularly pertains to supporting a workpiece at any of a plurality of angular attitudes, planar positions and rotational orientations with respect to a rotating drill bit.

2. Description of the Prior Art

The use of drill press systems of known designs and configurations is known in the prior art. More specifically, drill press systems of known designs and configurations previously devised and utilized for the purpose of supporting workpieces are known to consist basically of familiar, expected, and obvious structural configurations, notwithstanding the myriad of designs encompassed by the crowded prior art which has been developed for the fulfillment of countless objectives and requirements.

While the known prior art devices fulfill their respective, particular objectives and requirements, they do not describe a multi-function drill press system that allows for supporting a workpiece at any of a plurality of angular attitudes, planar positions and rotational orientations with respect to a rotating drill bit.

In this respect, the multi-function drill press system according to the present invention substantially departs from the conventional concepts and designs of the prior art, and in doing so provides an apparatus primarily developed for the purpose of supporting a workpiece at any of a plurality of angular attitudes, planar positions and rotational orientations with respect to a rotating drill bit.

Therefore, it can be appreciated that there exists a continuing need for a new and improved multi-function drill press system which can be used for supporting a workpiece at any of a plurality of angular attitudes, planar positions and rotational orientations with respect to a rotating drill bit. In this regard, the present invention substantially fulfills this need.

SUMMARY OF THE INVENTION

In view of the foregoing disadvantages inherent in the known types of drill press systems of known designs and configurations now present in the prior art, the present invention provides an improved multi-function drill press system. As such, the general purpose of the present invention, which will be described subsequently in greater detail, is to provide a new and improved multi-function drill press system and method which has all the advantages of the prior art and none of the disadvantages.

To attain this, the present invention essentially comprises a multi function drill press system in which a drill press has a drill bit rotatable about a vertical axis. The drill press has a housing with a motor for rotating the drill bit. The drill press has a base positionable on a recipient surface. The drill press also has a vertical support shaft having a lower end supported by the base and an upper end supporting the housing.

Next provided is a circular lower plate. The circular lower plate has a connector with an exterior end removably coupled to the lower plate and an interior end removably coupled to the support shaft. A cylindrical pin with set screws is provided though the connector and the lower plate to secure the pin and the lower plate at any angular attitude with respect to the shaft and the drill bit. The lower plate has an upper surface and a lower surface with four radial slots in a cross-like configuration. The lower plate has four rectilinear recesses in the upper surface aligned with the slots.

Next provided is a circular upper plate. The circular plate has an upper surface and a lower surface with four radially aligned rows of threaded apertures there though. The rows are in a cross-like configuration. The upper plate has four rectilinear recesses in the lower surface aligned with the rows of apertures.

Next provided is a plurality of pairs of coupling blocks. Each block is in a rectilinear configuration. One pair of blocks is positionable in superposed recesses of the upper and lower plates. Each block has an upper extent positionable in a recess of the upper plate and a lower extent positionable in a recesses of the lower plate. Each block has a slot there through aligned with superposed slots of the plates.

Further, the upper plate is adapted to slide with respect to the lower plate and drill bit. Bolts with enlarged heads extend upwardly through the slots of the lower plate and the coupling blocks. The bolts are threaded into the threaded apertures of the upper plate to secure the upper plate in a preselected planar position with respect to the lower plate and shaft and drill bit.

Further, each plate has a central axis with aligned central apertures extending there through. The lower portion of the central aperture of the lower plate is smaller than the apertures there above. A pivot pin is removably positioned in the central aperture of the upper plate and the upper portion of the central aperture of the lower plate. In this manner, the upper plate is adapted to rotate and change its rotational orientation with respect to the lower plate when the pin is within the central apertures and the coupling blocks are removed from the recesses.

Next provided are three spring urged balls in the lower surface of the upper plate. The three spring urged balls include a radially interior ball, a radial intermediate ball, and a radially exterior ball. A plurality of associated indents are provided in the upper surface of the lower plate. One of the balls is positioned in an associated indent to retain the upper plate in a preselected angular orientation with respect to the lower plate. The indents are in three concentric rings centered at the axis of the plates. The three concentric rings include an interior ring having four equally spaced indents, an intermediate ring having eight equally spaced indents, and an exterior ring having 12 equally spaced indents. In this manner, a plurality of preselected rotational orientations of the upper plate with respect to the lower plate are provided. Threaded supplemental apertures are provided in the upper plate with a thread adjuster in each supplemental aperture for adjusting the position of the spring urged balls.

Lastly provided is a cylindrical extender adapted for use as a substitute for the connector to allow drilling at a greater distance from the shaft. The extender has an exterior end removably coupled to the lower plate and an interior end removably coupled to the support shaft. The interior end includes a fixed plate with indicia. A circular rotator is attached to the interior end with bolts for securing the extender and the rotator at any of a plurality of angular attitudes with respect to the shaft and the drill bit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi-function drill press system which has all of the advantages of the prior art drill press systems of known designs and configurations and none of the disadvantages It is another object of the present invention to provide a new and improved multi-function drill press system which may be easily and efficiently manufactured and marketed.

It is further object of the present invention to provide a new and improved multi-function drill press system which is of durable and reliable constructions.

An even further object of the present invention is to provide a new and improved multi-function drill press system which is susceptible of a low cost of manufacture with regard to both materials and labor, and which accordingly is then susceptible of low prices of sale to the consuming public, thereby making such multi-function drill press system economically available to the buying public.

Even still another object of the present invention is to provide a multi-function drill press system for supporting a workpiece at any of a plurality of angular attitudes, planar positions and rotational orientations with respect to a rotating drill bit.

Lastly, it is an object of the present invention to provide a new and improved drill press having a bit, a base and a support shaft with a lower end supported by the base and an upper end supporting the housing. A lower plate with a connector coupled between the lower plate and the support shaft varies the angular attitude of lower plate with respect to the bit. An upper plate with threaded apertures, recesses, blocks and bolts secures the upper plate in preselected planar positions with respect to the lower plate. Aligned central apertures in the plates with a pivot pin provide a plurality of preselected rotational orientations of the upper plate with respect to the lower plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 5, 6 and 7 are cross sectional views taken along lines 5-5, 6-6 and 7-7 of FIG. 3.

FIG. 8 is an enlarged illustration taken at Circle 8 of FIG. 6.

The same reference numerals refer to the same parts throughout the various Figures.

DESCRIPTION OF THE PREFERRED EMBODIMENT

Figure 1:
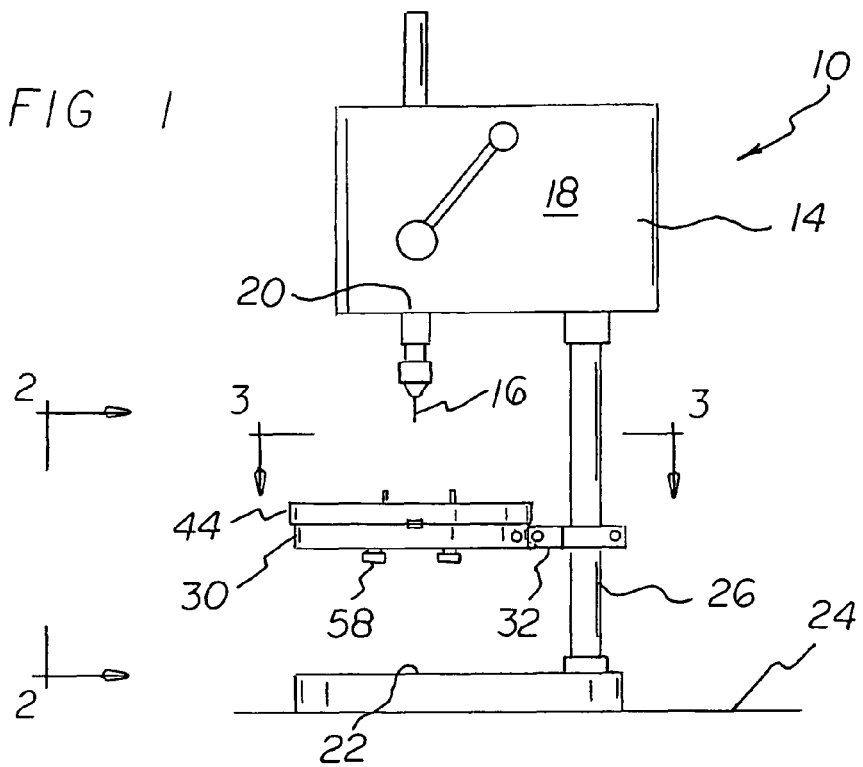
FIG. 1 is a side elevational view of a multi function drill press system constructed in accordance with the principles of the present invention.
Figure 2:
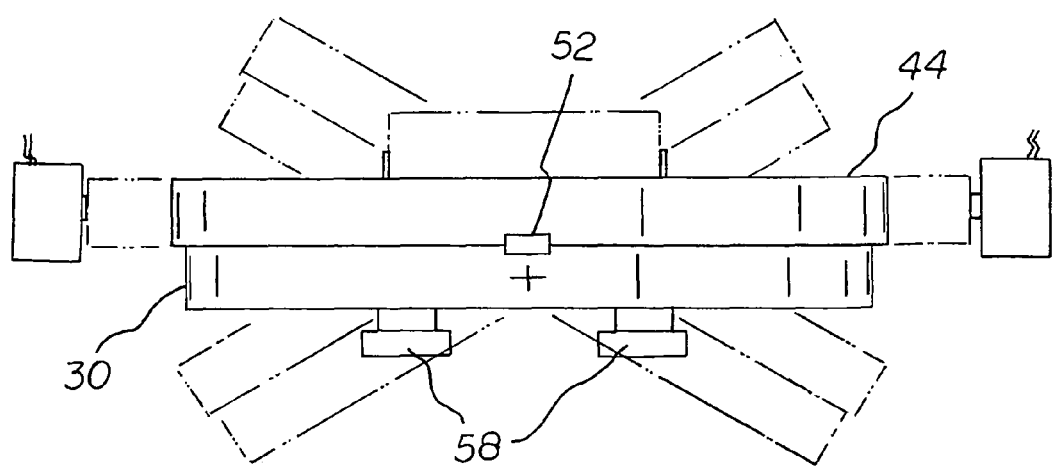
FIG. 2 is a front elevational view taken along line 2-2 of FIG. 1.
Figure 3:
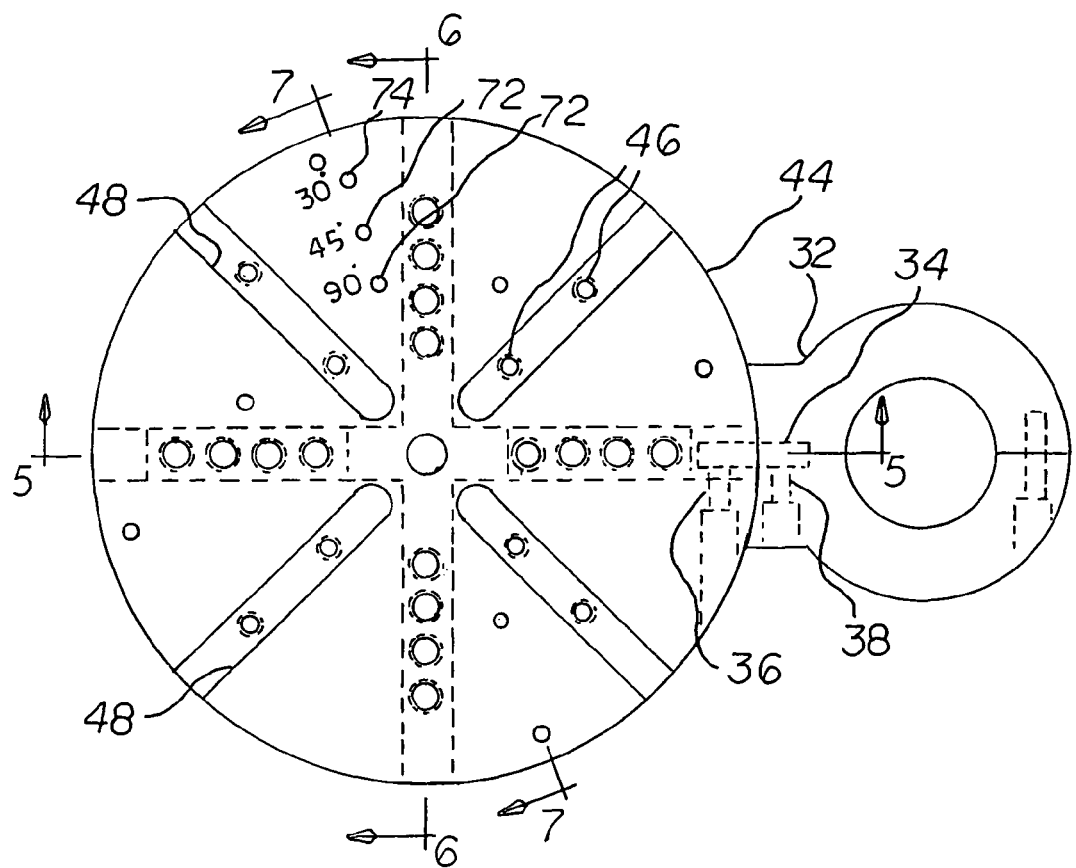
FIG. 3 is a plan view of a the upper plate and connector taken along line 3-3 of FIG. 1.
Figure 4:
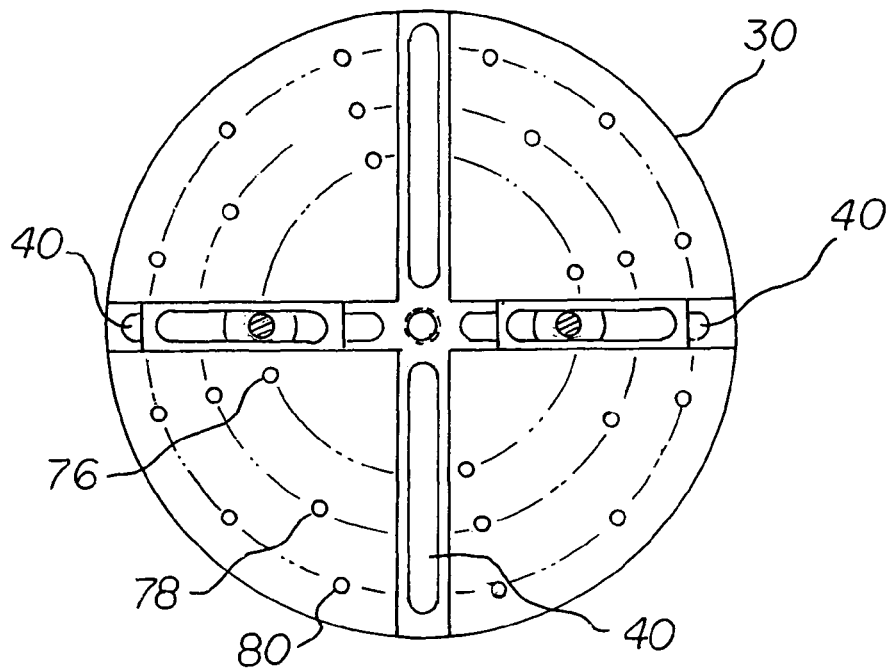
FIG. 4 is a plan view of a the lower plate and connector blocks.
Figure 9:
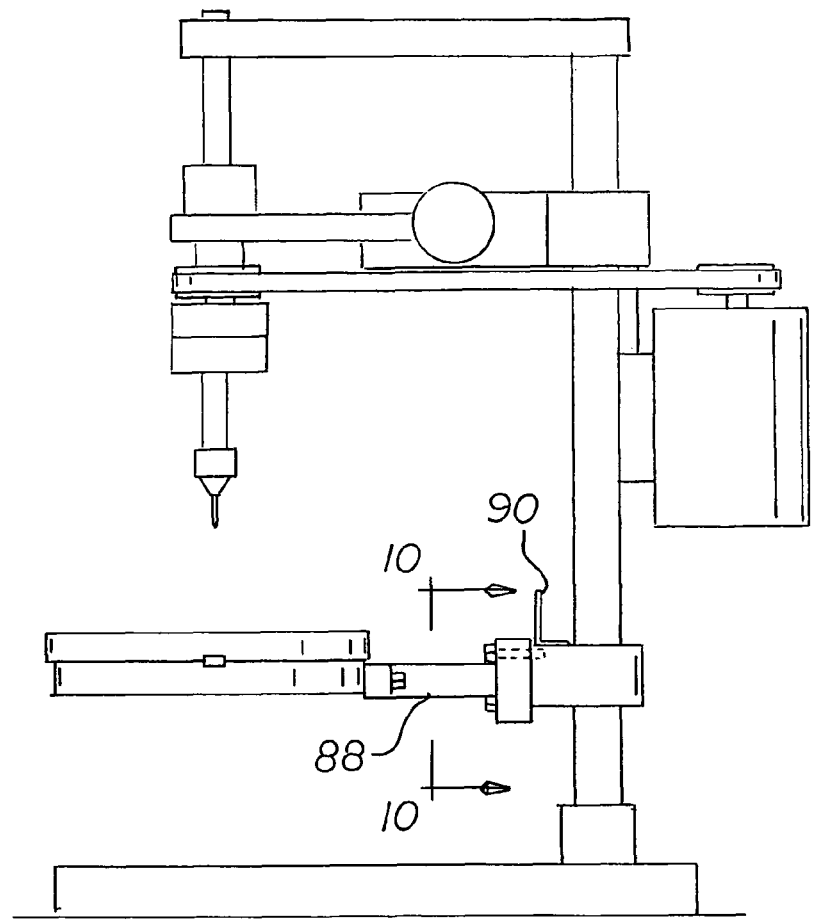
FIG. 9 is a side elevational view of a multi function drill press system constructed in accordance with an alternate embodiment of the present invention.
Figure 10:
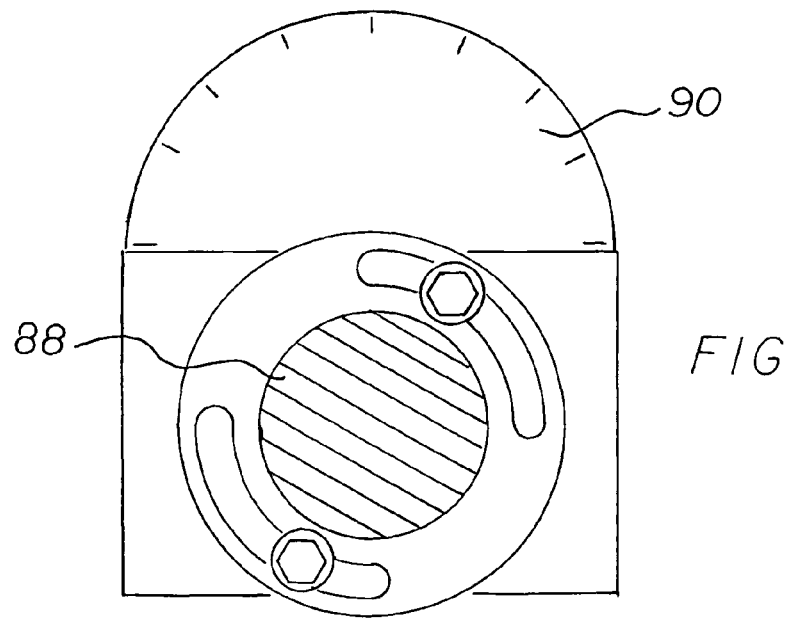
FIG. 10 is a cross sectional view taken along line 9-9 of FIG. 8.

With reference now to the drawings, and in particular to FIG. 1 thereof, the preferred embodiment of the new and improved multi-function drill press system embodying the principles and concepts of the present invention and generally designated by the reference numeral 10 will be described.

The present invention, the multi-function drill press system 10 is comprised of a plurality of components. Such components in their broadest context include a drill press, a lower plate and an upper plate with aligned central apertures in the plates and with a pivot pin. Such components are individually configured and correlated with respect to each other so as to attain the desired objective.

The multi function drill press system 10 supports a workpiece at any of a plurality of angular attitudes, planar positions, and rotational orientations with respect to a rotating drill bit. The supporting is done in a safe, convenient and economical manner.

First provided is a drill press 14. The drill press has a drill bit 16 rotatable about a vertical axis. The drill press has a housing 18 with a motor 20 for rotating the drill bit. The drill press has a base 22 positionable on a recipient surface 24. The drill press also has a vertical support shaft 26 having a lower end supported by the base and an upper end supporting the housing.

Next provided is a circular lower plate 30. The circular lower plate has a connector 32 with an exterior end removably coupled to the lower plate and an interior end removably coupled to the support shaft. A cylindrical pin 34 with set screws 36, 38 is provided though the connector and the lower plate to secure the pin and the lower plate at any angular attitude with respect to the shaft and the drill bit. The lower plate has an upper surface and a lower surface with four radial slots 40 in a cross-like configuration. The lower plate has four rectilinear recesses in the upper surface aligned with the slots.

Next provided is a circular upper plate 44. The circular plate has an upper surface and a lower surface with four radially aligned rows of threaded apertures 46 there though. The rows are in a cross-like configuration. The upper plate has four rectilinear recesses 48 in the lower surface aligned with the rows of apertures.

Next provided is a plurality of pairs of coupling blocks 52. Each block is in a rectilinear configuration. One pair of blocks is positionable in superposed recesses of the upper and lower plates. Each block has an upper extent positionable in a recess of the upper plate and a lower extent positionable in a recesses of the lower plate. Each block has a slot there through aligned with superposed slots of the plates. Shallow blocks 53 are placed in the recesses of the lower plate when in the rotational mode. The upper surface of the shallow blocks are in the same plane as the upper surface of the lower plate. As such, the spring urged balls will not drop into the recesses of the lower plate to preclude rotation.

Further, the upper plate is adapted to slide with respect to the lower plate and drill bit. Bolts 56 with enlarged heads 58 extend upwardly through the slots of the lower plate and the coupling blocks. The bolts are threaded into the threaded apertures of the upper plate to secure the upper plate in a preselected planar position with respect to the lower plate and shaft and drill bit.

Further, each plate has a central axis with aligned central apertures 62, 64 extending there through. The lower portion of the central aperture of the lower plate is smaller than the apertures there above. A pivot pin 66 is removably positioned in the central aperture of the upper plate and the upper portion of the central aperture of the lower plate. In this manner, the upper plate is adapted to rotate and change its rotational orientation with respect to the lower plate when the pin is within the central apertures and the coupling blocks are removed from the recesses.

Next provided are three spring urged balls in the lower surface of the upper plate. The three spring urged balls include a radially interior ball 70, a radial intermediate ball 72, and a radially exterior ball 74. A plurality of associated indents are provided in the upper surface of the lower plate. One of the balls is positioned in an associated indent to retain the upper plate in a preselected angular orientation with respect to the lower plate. The indents are in three concentric rings centered at the axis of the plates. The three concentric rings include an interior ring having four equally spaced indents 76, an intermediate ring having eight equally spaced indents 78, and an exterior ring having 12 equally spaced indents 80. In this manner, a plurality of preselected rotational orientations of the upper plate with respect to the lower plate are provided. Threaded supplemental apertures 82 are provided in the upper plate with a thread adjuster 84 in each supplemental aperture for adjusting the position of the spring urged balls.

Lastly provided is a cylindrical extender 88 adapted for use as a substitute for the connector to allow drilling at a greater distance from the shaft. The extender has an exterior end removably coupled to the lower plate and an interior end removably coupled to the support shaft. The interior end includes a fixed plate with indicia 90. A circular rotator is attached to the interior end with bolts for securing the extender and the rotator at any of a plurality of angular attitudes with respect to the shaft and the drill bit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi function drill press system comprising:
    a drill press having a bit, a base and a support shaft with a lower end supported by the base and an upper end supporting the housing;
    a lower plate with a connector coupled between the lower plate and the support shaft for varying the angular attitude of lower plate with respect to the bit;
    an upper plate with threaded apertures, recesses, blocks and bolts to secure the upper plate in preselected planar positions with respect to the lower plate; and
    aligned central apertures in the plates with a pivot pin for providing a plurality of preselected rotational orientations of the upper plate with respect to the lower plate.

2. The system as set forth in claim 1 wherein the cylindrical pin has associated set screws though the connector and the lower plate for securing the pin and the lower plate at any angular attitude with respect to the shaft and the drill bit.

3. The system as set forth in claim 1 wherein the blocks include a plurality of pairs of coupling blocks, each block being in a rectilinear configuration, one pair of blocks positionable in superposed recesses of the upper and lower plates, each block having an upper extent positionable in a recess of the upper plate and a lower extent positionable in a recesses of the lower plate, each block having a slot there through aligned with superposed slots of the plates.

4. The system as set forth in claim 1 wherein each plate having a central axis with aligned central apertures extending there through, the lower portion of the central aperture of the lower plate being smaller than the apertures there above, a pivot pin removably positioned in the central aperture of the upper plate and the upper portion of the central aperture of the lower plate whereby the upper plate is adapted to rotate and change its rotational orientation with respect to the lower plate when the pin is within the central apertures and the coupling blocks are removed from the recesses, a plurality spring urged balls in the lower surface of the upper plate, a plurality of associates indents in the upper surface of the lower plate, the indents being in concentric rings centered at the axis of the plates.

5. The system as set forth in claim 1 and further including:
    a cylindrical extender adapted for use as a substitute for the connector to allow drilling at a greater distance from the shaft, the extender having an exterior end removably coupled to the lower plate and an interior end removably coupled to the support shaft, the interior end including a fixed plate with indicia and a circular rotator attached to the interior end with bolts for securing the extender and the rotator at any of a plurality of angular attitudes with respect to the shaft and the drill bit.

6. A multi function drill press system for supporting a workpiece at any of a plurality of angular attitudes and planar positions and rotational orientations with respect to a rotating drill bit, such supporting being done in a safe, convenient and economical manner, the system comprising, in combination:
    a drill press having a drill bit rotatable about a vertical axis, a housing with a motor for rotating the drill bit, a base positionable on a recipient surface, and a vertical support shaft having a lower end supported by the base and an upper end supporting the housing;

a circular lower plate with a connector, the connector having an exterior end removably coupled to the lower plate and an interior end removably coupled to the support shaft, a cylindrical pin with set screws though the connector and the lower plate for securing the pin and the lower plate at any angular attitude with respect to the shaft and the drill bit, the lower plate having an upper surface and a lower surface with four radial slots in a cross-like configuration, the lower plate having four rectilinear recesses in the upper surface aligned with the slots;

a circular upper plate having an upper surface and a lower surface with four radially aligned rows of threaded apertures there though, the rows being in a cross-like configuration, the upper plate having four rectilinear recesses in the lower surface aligned with the rows of apertures;

a plurality of pairs of coupling blocks, each block being in a rectilinear configuration, one pair of the blocks positionable in superposed recesses of the upper and lower plates, each block having an upper extent positionable in a recess of the upper plate and a lower extent positionable in a recesses of the lower plate, each block having a slot there through aligned with superposed slots of the plates;

the upper plate being adapted to slide with respect to the lower plate and drill bit and further including bolts with enlarged heads extending upwardly through the slots of the lower plate and the coupling blocks and threaded into the threaded apertures of the upper plate to secure the upper plate in a preselected planar position with respect to the lower plate and shaft and drill bit;

each plate having a central axis with aligned central apertures extending there through, the lower portion of the central aperture of the lower plate being smaller than the apertures there above, a pivot pin removably positioned in the central aperture of the upper plate and the upper portion of the central aperture of the lower plate whereby the upper plate is adapted to rotate and change its rotational orientation with respect to the lower plate when the pin is within the central apertures and the coupling blocks are removed from the recesses;

three spring urged balls in the lower surface of the upper plate including a radially interior ball and a radial intermediate ball and a radially exterior ball, a plurality of associated indents in the upper surface of the lower plate, one of the balls being positioned in an associated one of the indents to retain the upper plate in a preselected angular orientation with respect to the lower plate, the indents being in three concentric rings centered at the axis of the plates, the three concentric rings being an interior ring having four equally spaced indents, an intermediate ring having eight equally spaced indents, and an exterior ring having 12 equally spaced indents, for providing a plurality of preselected rotational orientations of the upper plate with respect to the lower plate, and threaded supplemental apertures in the upper plate with a thread adjuster in each supplemental aperture for adjusting the position of the spring urged balls; and a cylindrical extender adapted for use as a substitute for the connector to allow drilling at a greater distance from the shaft, the extender having an exterior end removably coupled to the lower plate and an interior end removably coupled to the support shaft, the interior end including a fixed plate with indicia and a circular rotator attached to the interior end with bolts for securing the extender and the rotator at any of a plurality of angular attitudes with respect to the shaft and the drill bit.

* * * * *